US012693376B2

(12) United States Patent
Sanson et al.

(10) Patent No.: US 12,693,376 B2
(45) Date of Patent: Jul. 28, 2026

(54) RADAR DETECTOR WITH TRACKING FEEDBACK

(71) Applicant: GM Cruise Holdings LLC, San Francisco, CA (US)

(72) Inventors: Jessica Bartholdy Sanson, Munich (DE); Jorge Julio Jácome Muñoz, Munich (DE); Kalin Hristov Kabakchiev, Munich (DE); Andre Giere, Oberpframmern (DE)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 252 days.

(21) Appl. No.: 18/469,486

(22) Filed: Sep. 18, 2023

(65) Prior Publication Data

US 2025/0085386 A1     Mar. 13, 2025

(30) Foreign Application Priority Data

Sep. 13, 2023     (EP) ..................................... 23197037

(51) Int. Cl.
G01S 7/292          (2006.01)
G01S 7/41           (2006.01)
(Continued)

(52) U.S. Cl.
CPC .............. G01S 7/292 (2013.01); G01S 7/415 (2013.01); G01S 13/42 (2013.01); G01S 13/931 (2013.01)

(58) Field of Classification Search
CPC .......... G01S 7/292; G01S 7/415; G01S 13/42; G01S 13/931; G01S 7/4808; G01S 7/354
(Continued)

(56) References Cited

U.S. PATENT DOCUMENTS 1,143,544 A * 6/1915 Karcher ................ F41B 11/647
                                                            124/67
4,649,390 A * 3/1987 Andrews ................. G01S 13/87
                                                            342/158
(Continued)

FOREIGN PATENT DOCUMENTS

EP          3239737 A1 * 11/2017     ............. G01S 13/52
EP          3239737 B1 * 11/2018     ............. G01S 7/415
(Continued)

OTHER PUBLICATIONS

A Kalman Filter Tracker Based Bayesian Detector for Radar Interference in Radar Astronomy (IEEE International conference of Acoustics, Speech and Signal Processing, 2005, Proceedings. Mar. 18-23, 2005, vol. 4: iv/657-iv/660) (Year: 2005).*
(Continued)

*Primary Examiner* — Nuzhat Pervin
(74) *Attorney, Agent, or Firm* — CANTOR COLBURN LLP

(57) ABSTRACT

A radar system comprises a transmit antenna that transmits a radar signal and a receive antenna that receives a radar return. The system further comprises one or more processors configured to perform acts comprising: detecting object based on information in the radar return. The acts further comprise generating and providing to a tracking system a point cloud comprising information related to the detected object. Additionally, the acts comprise receiving from the tracking system an indication of a predicted cell in which the detected object is predicted to be located in a subsequent radar frame, wherein the predicted cell is associated with a confidence value. The acts further comprise reducing, for the subsequent radar frame, a detection threshold value for the predicted cell.

17 Claims, 7 Drawing Sheets

(51) Int. Cl.
G01S 13/42 (2006.01)
G01S 13/931 (2020.01)
(58) Field of Classification Search
USPC ......................................................... 342/91
See application file for complete search history.

(56) References Cited

U.S. PATENT DOCUMENTS

| | | | | |
|---|---|---|---|---|
| 5,311,183 | A * | 5/1994 | Mathews | G01S 13/953 |
| | | | | 342/26 B |
| 5,465,095 | A * | 11/1995 | Bryant | G01S 13/5244 |
| | | | | 342/162 |
| 9,612,328 | B1 * | 4/2017 | Breiholz | G01S 13/95 |
| 10,222,463 | B2 * | 3/2019 | Hong | G01S 13/72 |
| 10,365,363 | B2 * | 7/2019 | Rohr | G01C 21/12 |
| 10,539,669 | B2 * | 1/2020 | Ikram | G01S 13/42 |
| 10,788,570 | B2 * | 9/2020 | Wilson | G01S 13/937 |
| 10,830,869 | B2 * | 11/2020 | Raphaeli | G01S 7/403 |
| 10,935,650 | B2 * | 3/2021 | Campbell | G01S 13/87 |
| 11,531,088 | B2 * | 12/2022 | Popov | G06N 3/045 |
| 11,536,850 | B2 * | 12/2022 | Sharma | G01S 19/05 |
| 11,592,523 | B2 * | 2/2023 | Schubert | G01S 13/5246 |
| 11,614,535 | B2 * | 3/2023 | Jo | G01S 13/878 |
| | | | | 342/70 |
| 11,644,560 | B2 * | 5/2023 | Livshitz | G01S 13/584 |
| | | | | 342/107 |
| 11,719,805 | B2 * | 8/2023 | Santra | G01S 7/415 |
| | | | | 342/109 |
| 11,885,907 | B2 * | 1/2024 | Popov | G06T 7/246 |
| 11,927,668 | B2 * | 3/2024 | Fontijne | G06V 20/58 |
| 12,164,058 | B2 * | 12/2024 | Chebiyyam | G01S 13/931 |
| 12,174,641 | B2 * | 12/2024 | Moawad | G05D 1/0257 |
| 12,204,010 | B2 * | 1/2025 | Saitto | G01S 19/14 |
| 12,253,591 | B2 * | 3/2025 | Hong | G01S 13/723 |
| 12,320,887 | B2 * | 6/2025 | Arbabian | G01S 7/354 |
| 12,344,270 | B2 * | 7/2025 | Oh | G06F 18/25 |
| 12,436,261 | B1 * | 10/2025 | Srivastav | G01S 7/023 |
| 2008/0111731 | A1 * | 5/2008 | Hubbard | G01S 13/872 |
| | | | | 342/160 |
| 2010/0097182 | A1 * | 4/2010 | Niktash | H04B 5/77 |
| | | | | 455/41.3 |
| 2015/0168539 | A1 * | 6/2015 | Himmelstoss | G01S 13/931 |
| | | | | 342/159 |
| 2015/0331098 | A1 * | 11/2015 | Luebbert | G01S 7/354 |
| | | | | 342/91 |
| 2016/0018511 | A1 * | 1/2016 | Nayyar | G01S 7/03 |
| | | | | 342/27 |
| 2016/0097839 | A1 * | 4/2016 | Fox | G01S 13/723 |
| | | | | 342/52 |
| 2016/0103213 | A1 * | 4/2016 | Ikram | G01S 13/42 |
| | | | | 342/105 |
| 2017/0090013 | A1 * | 3/2017 | Paradie | G01S 7/2926 |
| 2017/0261602 | A1 * | 9/2017 | Olshansky | B60W 30/09 |
| 2018/0348343 | A1 * | 12/2018 | Achour | H01Q 1/364 |
| 2019/0041494 | A1 * | 2/2019 | Roger | G01S 7/003 |

| | | | | |
|---|---|---|---|---|
| 2019/0146081 | A1 * | 5/2019 | Bilik | G01S 13/931 |
| | | | | 701/301 |
| 2019/0383901 | A1 * | 12/2019 | Elad | G01S 13/42 |
| 2020/0041637 | A1 * | 2/2020 | Koch | G01S 13/931 |
| 2020/0132826 | A1 * | 4/2020 | Achour | G01S 13/538 |
| 2020/0174096 | A1 * | 6/2020 | Cho | G01S 13/343 |
| 2020/0326411 | A1 * | 10/2020 | Zhou | G01S 7/415 |
| 2021/0156960 | A1 * | 5/2021 | Popov | G01S 13/89 |
| 2021/0156963 | A1 * | 5/2021 | Popov | G06N 3/0464 |
| 2021/0208242 | A1 * | 7/2021 | Sudarsan | G01S 13/42 |
| 2021/0382165 | A1 * | 12/2021 | Choi | G01S 7/354 |
| 2021/0389452 | A1 * | 12/2021 | Lau | G01S 13/347 |
| 2021/0405178 | A1 * | 12/2021 | Livshitz | G01S 13/34 |
| 2022/0196829 | A1 * | 6/2022 | Chen | G01S 13/931 |
| 2022/0308205 | A1 * | 9/2022 | Roesler | G01S 13/726 |
| 2022/0319188 | A1 * | 10/2022 | Kogut | G06V 10/764 |
| 2022/0335279 | A1 * | 10/2022 | Tyagi | G06N 20/00 |
| 2022/0349995 | A1 * | 11/2022 | Breddermann | G01S 7/4026 |
| 2022/0373669 | A1 * | 11/2022 | Mannesson | G01S 13/42 |
| 2023/0003872 | A1 * | 1/2023 | Qian | G01S 13/723 |
| 2023/0131721 | A1 * | 4/2023 | Chebiyyam | G01S 7/412 |
| | | | | 356/4.01 |
| 2023/0145218 | A1 * | 5/2023 | Murray | G06N 7/01 |
| | | | | 701/24 |
| 2024/0004031 | A1 * | 1/2024 | Bansal | G01S 7/411 |
| 2024/0045052 | A1 * | 2/2024 | Traa | G01S 13/93 |
| 2024/0053464 | A1 * | 2/2024 | Dahnoun | G01S 13/886 |
| 2024/0061075 | A1 * | 2/2024 | Popov | G01S 13/89 |
| 2024/0077582 | A1 * | 3/2024 | Cerqueira Pinto | G01S 7/403 |
| 2024/0142614 | A1 * | 5/2024 | Cao | G01S 13/931 |
| 2024/0192355 | A1 * | 6/2024 | Zhang | G01S 7/2883 |
| 2024/0193788 | A1 * | 6/2024 | Tang | G06V 10/50 |
| 2024/0337741 | A1 * | 10/2024 | Klotzbuecher | G01S 13/872 |
| 2024/0345216 | A1 * | 10/2024 | Tzagkas | G01S 7/4026 |
| 2024/0355215 | A1 * | 10/2024 | Robertson | G01S 13/87 |
| 2024/0361445 | A1 * | 10/2024 | Paker | G01S 13/42 |
| 2024/0393459 | A1 * | 11/2024 | Roesler | G01S 13/58 |
| 2025/0110213 | A1 * | 4/2025 | Gebhardt | G01S 13/42 |
| 2025/0180699 | A1 * | 6/2025 | Fan | G01S 7/4026 |

FOREIGN PATENT DOCUMENTS

| | | | | | |
|---|---|---|---|---|---|
| EP | | 3805794 A1 * | 4/2021 | | G01S 13/9027 |
| FR | | 3041438 A1 | 3/2017 | | |
| WO | WO-2021177956 A1 * | | 9/2021 | | G01S 13/582 |
| WO | WO-2022049241 A1 * | | 3/2022 | | G01S 13/87 |

OTHER PUBLICATIONS

European Search Report for European Applicaton No. 23197037; dated Jan. 30, 2024; 2 pages.
Weizhen Dong et al: "A Kalman-Tracker-Based Bayesian Detector for Radar Interference in Radio Astronomy", 2005 IEEE International Conference On Acoustics, Speech, and Signal Processing—Mar. 18-23, 2005—Philadelphia, PA, USA, IEEE, Piscataway, NJ, vol. 4, Mar. 18, 2005 (Mar. 18, 2005), pp. 657-660.

* cited by examiner

502 — START

500

504 — DETECT MOVING OBJECT VIA RADAR RETURN

506 — TRANSMIT OBJECT INFORMATION TO TRACKING SYSTEM

508 — RECEIVE TRACKING SYSTEM PREDICTION(S)

510 — SELECT CELL(S) FOR ADJUSTMENT

512 — CALCULATE THRESHOLD ADJUSTMENT(S) FOR SELECTED CELL(S) BASED ON PREDICTIONS

514 — ADJUST CELL THRESHOLD(S)

516 — END

RADAR DETECTOR WITH TRACKING FEEDBACK

RELATED APPLICATION

This application claims priority to European Patent Application No. EP32197037.7, filed on Sep. 13, 2023, and entitled "RADAR DETECTOR WITH TRACKING FEEDBACK." The entirety of this application is incorporated herein by reference.

BACKGROUND

Autonomous or assisted driving strategies have been facilitated through sensing an environment around a vehicle. Radar sensors are conventionally used in connection with detecting and classifying objects in an environment; advantages of radar over other types of sensors (such as cameras or lidar) include robustness in regard to lighting and weather conditions. Often, radar sensors are deployed with cameras and/or lidar sensors to provide different modes of detection and redundancy. In certain scenarios, performance of lidar and/or cameras is negatively impacted by environmental features, such as fog, rain, snow, bright sunlight, lack of adequate light, etc. Accordingly, in these scenarios, radar is relied heavily upon to detect and classify objects in the environment, while lidar and camera sensors are less heavily relied upon.

Conventionally, a radar sensor generates a radar tensor, and the radar tensor is processed to detect and classify objects in the environment. For instance, the radar tensor includes power measurements generated by the radar sensor along different dimensions, such as Doppler, range, azimuth, and elevation. The radar tensor is then further processed to detect, classify, and track objects in the scene over time. As radar systems increase in popularity and are included in more and more vehicles, accurate tracking of moving objects becomes ever more important. False-positive detections are problematic, and at the same time, real objects need to be accurately and reliably detected and tracked. Conventional approaches have not satisfactorily addressed problems created by false-positive detections and object tracking reliability.

SUMMARY

The following is a brief summary of subject matter that is described in greater detail herein. This summary is not intended to be limiting as to the scope of the claims.

Described herein are various technologies relating to radar systems, and more specifically, radar systems employed in autonomous vehicles, aircraft, watercraft, and the like. With more particularity, various technologies described herein facilitate providing increased radar sensitivity in radar cells where a detected object is likely to be located in subsequent radar frames.

Radar detection thresholds offer a tradeoff between false detection mitigation and real object detection. When a detection threshold is too high, fewer false detections occur, but real targets may be missed. When the detection threshold is set too low, real targets are more likely to be detected but the rate of false detections due to noise also increases. The described aspects facilitate providing a dynamically adjustable radar detection threshold on a frame-by-frame basis.

When an object is detected by a radar sensor in a given radar frame, the sensor generates a radar point cloud comprising radar cells in the monitored environment. The point cloud includes information about the detected object, which can include without limitation velocity, range, angle, and azimuth information, etc. The sensor provides the point cloud to a tracking system, which can also receive other object information from other monitoring systems (e.g., lidar, camera, etc.). Based on this information, the tracking system provides to the sensor a prediction of a radar cell in which the detected object will be located in the next radar frame and also provides a confidence value for the prediction. Based on the confidence value, the radar sensor adaptively adjusts a detection power threshold applied for the predicted cell on a frame-by-frame basis to improve a likelihood of detection of the object in the next frame. In one embodiment, the radar sensor reduces the detection threshold for the predicted cell, and optionally one or more cells neighboring the predicted cell. In another embodiment, the radar sensor raises detection thresholds for cells that are not predicted to reduce the likelihood of false detections in those cells.

In a scenario in which the sensor and/or tracking system has a map of the monitored environment, the sensor can adaptively change the detection threshold for a given cell based on what the sensor is seeing (e.g., static objects that the sensor knows are present or not present in a given cell according to the map). For instance, the sensor and/or tracking system can identify cells with static objects as cells that cannot (or should not) have a moving object, and cells without static objects as cells where a moving object could be detected. By removing cells having static objects from consideration for threshold adjustment, computational overhead is reduced, and prediction accuracy is improved.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
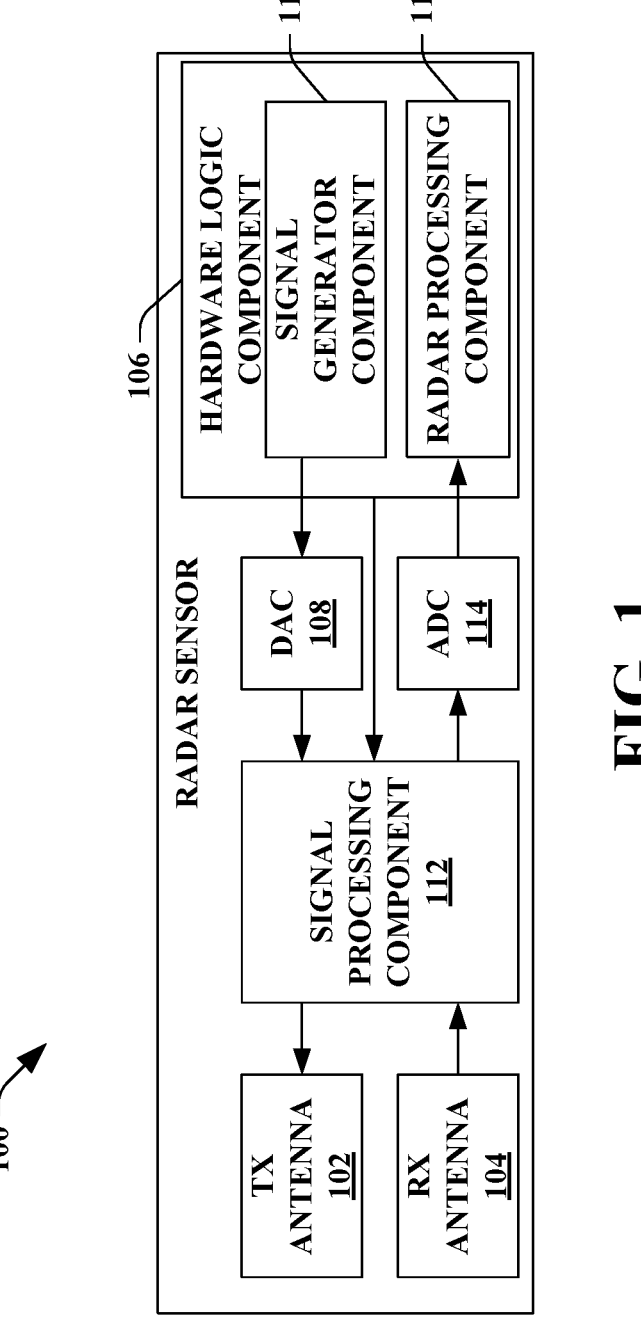
FIG. 1 is a functional block diagram of an exemplary radar sensor.

Various technologies pertaining to autonomous vehicle (and other) radar systems are described herein. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Further, as used herein, the term "exemplary" is intended to mean serving as an illustration or example of something and is not intended to indicate a preference.

Probability of detection is an important metric in radar systems because it measures the ability of the radar to correctly identify a target when it is present period a high probability of detection is desirable in many applications, because it allows the radar to detect targets even in challenging conditions, such as low signal-to-noise ratio (SNR) environments. One way to achieve a good probability of detection is by adjusting the detection threshold of the radar. The detection threshold is a value that determines whether a target is present or not based on the received signal strength. A higher threshold value results in fewer detections, but those that are detected are more likely to be actual targets. Conversely, a lower threshold value results in more detections but with a higher probability of false alarms (PFA). Thus, lowering the radar detection threshold to get a better detection probability also increases the false detection probability.

In autonomous vehicles, the tracking output from different sensors (e.g., lidar, camera, radar, etc.) can be used to select an appropriate threshold value for the radar detector. Specifically, the estimated target state provided by the tracking system (e.g., using a Kalman filter or the like) can be used to predict the expected range, angle, and velocity of the possible detection, and the radar can use this information to decrease the detection threshold in predicted cells while mitigating an increase in the PFA. In addition, the same can be done for areas where the system is not interested in detecting objects' velocity, ranges, and angles (e.g., where known stationary objects are present).

The described approach provides a technique for lowering the detection threshold of the radar sensor for areas (cells) where the target is expected to be detected using the tracking systems output. The tracking system provides information on the velocity, angle, and range of a detected object and indicates a likelihood of the position of the object in the next radar frame, and the detection threshold is decreased in the cell(s) indicated by the tracking system, which improves the probability of detection of the object in the next radar frame without strongly affecting the PFA.

With reference now to FIG. 1, an exemplary radar sensor system (also referred to as a radar system) 100 is illustrated, in which various features, circuits, etc. described herein can be employed. The radar sensor 100 includes a transmit antenna 102, a receive antenna 104, and a hardware logic component 106. Briefly, the hardware logic component 106 is configured to prepare radar signals that are transmitted by the transmit antenna 102, and to compute target solutions indicating estimated positions and/or velocities of objects based upon radar returns and/or other radar signals received by the receive antenna 104. In exemplary embodiments, various components of the radar sensor 100 can be integrated as a same system-on-a-chip (SoC). In various embodiments, the radar sensor 100 can be employed on a vehicle, such as a land vehicle, an aircraft, to identify positions and velocities of objects in the operational environment of the vehicle.

The radar sensor 100 further comprises one or more DACs 108. The hardware logic component 106 comprises a signal generator component 110 that prepares radar signals for transmission by way of the transmit antenna 102. The signal generator component 110 is configured to control the DAC 108 to cause the DAC 108 to generate an analog radar signal for transmission by the transmit antenna 102. In other words, the signal generator component 110 generates digital values that, when received by the DAC 108, cause the DAC 108 to output an analog radar signal having various desired signal characteristics. Hence, the radar sensor 100 is configured as a digitally modulated radar sensor, wherein characteristics of radar signals output by the transmit antenna 102 are digitally controlled by the signal generator component 110 of the hardware logic component 106. For example, the signal generator component 110 can be configured to control the DAC 108 such that the radar sensor operates as a phase modulated continuous wave (PMCW) radar sensor.

The radar sensor 100 further includes an analog signal processing component 112. The signal processing component 112 is generally configured to perform various analog signal processing operations on analog signals that are to be output by the transmit antenna 102 and/or that are received by the receive antenna 104. By way of example, and not limitation, the signal processing component 112 can amplify a radar signal output by the DAC 108 to increase the power of the radar signal prior to transmission by way of the transmit antenna 102. In a further example, the signal processing component 112 can be configured to mix a radar signal output by the DAC 108 with a carrier signal to shift a center frequency of the radar signal. The signal processing component 112 can include any of various components that are configured to perform these various functions. For example, the signal processing component 112 can include mixers, amplifiers, filters, or the like. Functionality of the signal processing component 112 and its constituent components can be controlled by the hardware logic component 106. The transmit antenna 102 receives processed radar signals from the signal processing component 112 and emits the radar signals into an operational environment of the radar sensor 100.

The receive antenna 104 receives radar returns from the operational environment. In exemplary embodiments, the radar returns received by the receive antenna 104 comprise reflections, from objects in the operational environment of the sensor 100, of radar signals emitted by the transmit antenna 102. It is to be understood that the radar returns received by the receive antenna 104 can further include reflections of radar signals emitted by other radar emitters that are active within the operational environment of the radar sensor 100. As will be described in greater detail below, the technologies described herein can reduce transmitter leakage and receiver saturation by hopping between frequency subbands used for transmission and receiving. Responsive to receipt of radar returns from the operational environment of the sensor 100, the receive antenna 104 outputs an electrical signal that is indicative of the received radar returns. This electrical signal is referred to herein as a radar signal and is transmitted along one or more transmission lines in the radar sensor 100, as distinct from radar returns that are received by the receive antenna 104 as radiated signals propagating through air or free space in the operational environment of the radar sensor 100.

The signal processing component 112 receives a radar signal from the receive antenna 104. The signal processing component 112 is configured to perform various analog signal processing operations over radar signals received from the receive antenna 104. By way of example, and not limitation, the signal processing component 112 can perform various mixing, filtering, and amplification operations on radar signals output by the receive antenna 104. The signal processing component 112 can be configured to perform various of these signal processing operations (e.g., mixing) based further upon a radar signal transmitted by the transmit antenna 102.

The radar sensor 100 further comprises one or more ADCs 114 that receives a processed radar signal from the signal processing component 112. The ADC 114 digitally samples the radar signal and outputs digital values that are indicative of amplitude of the radar signal over time. These digital values are collectively referred to herein as radar data. The radar data output by the ADC 114 are indicative of the radar returns received by the receive antenna 104.

The hardware logic component 106 receives the radar data from the ADC 114. The hardware logic component 106 further comprises a radar processing component 116. The radar processing component 116 is configured to compute positions and/or velocities of targets in the operational environment of the radar sensor 100 based upon the radar data. In a non-limiting example, the radar processing component 116 can compute a range, a bearing, and/or a velocity of a target in the operational environment of the sensor 100 based upon the radar data.

Figure 2:
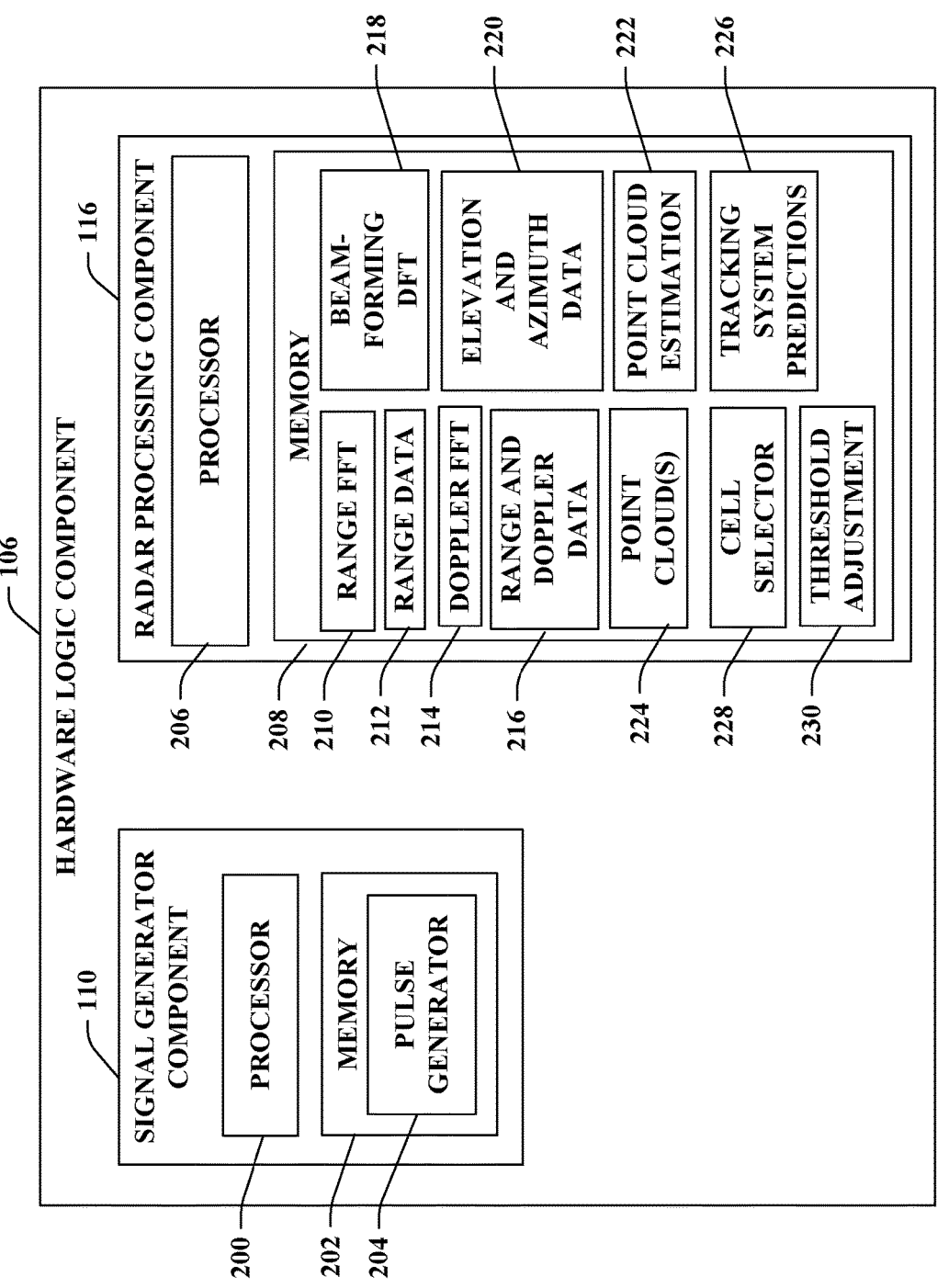
FIG. 2 illustrates a more detailed view of the hardware logic component.

With reference now to FIG. 2, a more detailed view of the hardware logic component 106 is illustrated. The hardware logic component 106 comprises the signal generator component 110 and the radar processing component 116, as discussed with regard to FIG. 1. The signal generator component 110 comprises a processor 200 and a memory 202 configured to provide certain functionality as described herein. For example, the memory 202 can store computer-executable instructions that, when executed by the processor 200, cause the signal generator component 110 to perform certain acts. The memory 202 comprises a ramp/pulse generator component 204 that generates ramps/pulses (depending on the type of radar system) for transmission. In one embodiment, the ramp/pulse generator component 204 performs time division multiplexing and/or frequency division multiplexing on the signals to be transmitted.

The radar processing component 116 comprises a processor 206 and a memory 208 configured to provide certain functionality as described herein. For example, the memory 208 can store computer executable instructions that, when executed by the processor 206, cause the radar processing component 116 to perform certain acts. The memory 208 comprises a range fast Fourier transform (FFT) component 210 that is executed on a digitized signal received from an ADC, such as the ADC 114 of FIG. 1, to generate range data values 212 for objects detected in a received radar return. A Doppler FFT 214 is executed on the range values to generate range and Doppler data values 216. A discrete Fourier transform (DFT) 218 is then executed on the range and Doppler data values to generate elevation and azimuth data values 220. A point cloud estimation component 222 is executed to generate one or more multi-dimensional point clouds 224 representing at least the range data values 212, the range and Doppler data values 216, and the elevation and azimuth data values 220.

The memory further comprises a tracking system predictions component 226 that receives and stores predictions related to future positions of detected objects. The tracking system (not shown in FIG. 2), also referred to herein as a perception system (see, e.g., FIG. 6, reference numeral 622), receives an indication (e.g., a point cloud, etc.) of a detection of an object from the radar sensor and generates a prediction regarding the position of the detected object in a subsequent time frame. In one embodiment the tracking system receives additional object detection information from, e.g., a lidar system, a camera detection system, etc. Based on object velocity, range, azimuth, etcetera, information received from the various detection systems, the tracking system is able to predict where the object will be in the next radar frame and sends the prediction to the tracking system prediction component 226.

A cell selector component 228 selects one or more radar cells for detection threshold adjustment based on the tracking system prediction. For example, the cell selector component 228 selects the radar cell indicated in the prediction for threshold adjustment by a threshold adjustment component 230. In another embodiment, the cell selector component 228 also selects one or more cells neighboring the predicted cell for threshold adjustment.

Camera, radar, and/or lidar sensors provide to the tracking system high-confidence measurements of a target object's range and angle, and the output of the tracking system also provides the velocity of the object. A radar sensor receiving the output of the tracking system can then lower its detection threshold to improve the probability of detection of the object in the next radar frame, even in low SNR environments. By using tracking output that is based on multiple sensors to inform the radar sensor(s) of the predicted state of the object, the overall perception of the environment can be improved, leading to better detection and tracking performance.

According to one embodiment, the tracking system provides a prediction of the target object's location for the next frame of the radar. The prediction information comprises the range, speed, and angle of the detection(s). In cases where the tracking system provides the total dimension of the target object (the object shape), then the range, velocity, and angle points of the object can be transferred into radar grid cells. Where the tracking information only includes a central estimation of the object location, the grid cells in which the position estimation is located, and optionally some neighboring cells, can be used to represent the object.

A confidence or probability value is assigned to the position prediction, which represents a likelihood ($P_{target}$) that the target will be in a given cell in the next time frame. The magnitude of the threshold reduction is based on the confidence value and constrained by a minimum power
(TH$_{min}$) expected by the radar in the radar return from the
object.

According to an example, a given (predicted) cell in
which the target object is expected to be in the next radar
frame has an original detection threshold (TH) of 20 dB
SNR, meaning that if a radar return includes a signature at
20 dB or higher, the sensor will consider that signature to
represent a real object and not a false detection (e.g., due to
noise). The tracking system sends to the sensor information
indicating that the target object is expected to be in the
predicted cell during the next radar frame, with 0.9 certainty
(on a scale of 0 to 1), at a certain range, speed, and angle,
based on current range, speed, and angle information. A
minimum detection power threshold (TH$_{min}$) represents a
minimum acceptable power level that the sensor needs to see
in a radar return in order to consider a detection as repre-
senting a real object and not a false alarm. E.g., 15 dB in this
example. The new reduced threshold (TH$_{New}$) is the given
by:

$$TH_{New} = TH - (TH - TH_{min}) \times P_{target}.$$

In the example described above, the new reduced detec-
tion threshold for the predicted cell would be:

$$TH_{New} = 20\,dB - (20\,dB - 15\,dB) \times 0.90;$$

$$TH_{New} = 20\,dB - (5\,dB) \times 0.90;$$

$$TH_{New} = 20\,dB - 4.5\,dB = 15.5\,dB.$$

As can be seen, as the confidence value approaches 1,
TH$_{New}$ approaches TH$_{min}$.

According to one embodiment, detection thresholds for
cells neighboring the predicted cell can also be adjusted. For
instance, cells that are immediately adjacent the predicted
cell can have their detection thresholds reduced by an
amount that is less than or equal to the threshold reduction
of the predicted cell.

In another embodiment, cells that are adjacent the adja-
cent cells can also have their detection thresholds reduced.
For instance, the predicted cell (the cell with the highest
confidence value) can be considered the "0" cell, and cells
immediately adjacent thereto (e.g., sharing a side, edge,
corner, etc.) can be considered first degree, or 1° cells, which
surround the 0 cell. Cells that are adjacent the 1° cells and
two cells away from the 0 cell are 2° cells, and so on to a
desired distance from the 0 cell. Detection thresholds for all
degrees of neighboring cells can be reduced by an amount
that is less than or equal to the threshold reduction of the 0
cell. In one embodiment, the detection threshold for a given
degree of cell is inversely proportional to its distance from
the 0 cell. For instance, 1° cells have a threshold reduction
that is less than or equal to the threshold reduction of the 0
cell, 2° cells have a threshold reduction that is less than or
equal to the threshold reduction of the 1° cells, and so on.
Each cell's detection threshold is reduced from its original
assigned detection threshold (TH) (20 dB in the foregoing
example, although any desired detection threshold can be
assigned to a given cell and different cells can have different
original assigned thresholds) by an amount calculated based
on the confidence value of the cell.

In another embodiment, 1°, 2°, ..., N° cells (where N is
an integer) that are in a line of travel of the target object (i.e.,
the target object is expected to eventually travel through
these cells) can have larger detection threshold reductions
than other respective 1°, 2°, ..., N° cells of the same degree;
i.e., a 1° cell in the line of travel of the target object can have
a larger threshold reduction than other 1° cells, and so on.

In another embodiment, cells that are behind the target
object as it moves in its line of travel are not selected for
detection threshold reduction. In yet another embodiment,
one or more neighboring cells (1°, 2°, ..., N°) that are not
selected for detection threshold reduction have their detec-
tion thresholds increased above their original detection
thresholds (TH) to reduce the number of false detections in
cells where the target object is unlikely to be in the subse-
quent time frame(s).

In yet another embodiment, cells that are behind the target
object as it moves in its line of travel are selected for
detection threshold reduction and reduced based on their
confidence values. For instance, for a slower object such as
a pedestrian, cyclist, slow moving vehicle, or the like, there
may be a possibility that the object may reverse course. In
this case, there still may be a low probability that the object
will reenter the cell. Accordingly, these cells can have their
detection thresholds reduced by an amount based on their
confidence values.

In another embodiment, the threshold reductions for the
predicted cell and the various neighboring cells form a
gradient of changing thresholds surrounding a detected
object's cell as the object moves. For example, the gradient
can be Gaussian, such that the predicted cell has the confi-
dence value and therefore the largest threshold reduction, 1°
cells have a next highest threshold reduction, 2° cells have
a threshold reduction that is less than the 1° cells, and so on.
Any cell that is assigned a confidence value by the tracking
system could potentially be occupied by the object in a next
radar frame, and therefore has its original detection thresh-
old (TH) reduced for the next radar frame by an amount that
is based on its assigned confidence value.

Additionally or alternatively, neighboring cells' detection
thresholds can be reduced based on their respective confi-
dence values. For instance, the predicted cell may have a
0.95 confidence value, 1° cells have unique confidence
values that are less than 0.95, although one or more 1° cells
may have the same confidence value during a given frame.
2° cells have confidence values that are typically lower than
the 1° cells confidence values, although there may be 2° cells
that have confidence values that are higher than some 1°
cells' confidence values. For instance, a 2° cell that is
directly in the line of travel of the object may have a higher
confidence value than a 1° directly behind the predicted cell.

Each cell's detection threshold is reduced from its original
assigned detection threshold (TH) by an amount calculated
in the same manner as the threshold reduction for the
predicted cell, on a per-frame basis. Thus, as the object
moves through cells and a given cell's confidence value falls
back toward 0, the amount by which the original assigned
detection threshold is reduced will decrease. When the
confidence value for a given cell reaches 0, the cell is back
at its original assigned detection threshold.

In yet another embodiment, neighboring cells have their
detection thresholds reduced based on the reduction calcu-
lated for the predicted cell. For instance, if the predicted
cell's detection threshold is reduced by X dB, where X is a
real number, then the 1° cells' thresholds can be reduced by
YX dB (where Y is a percentage), and the 2° cells' thresholds can be reduced by ZX dB (where Z is a percentage less than or equal to Y), and so on.

Figure 3:
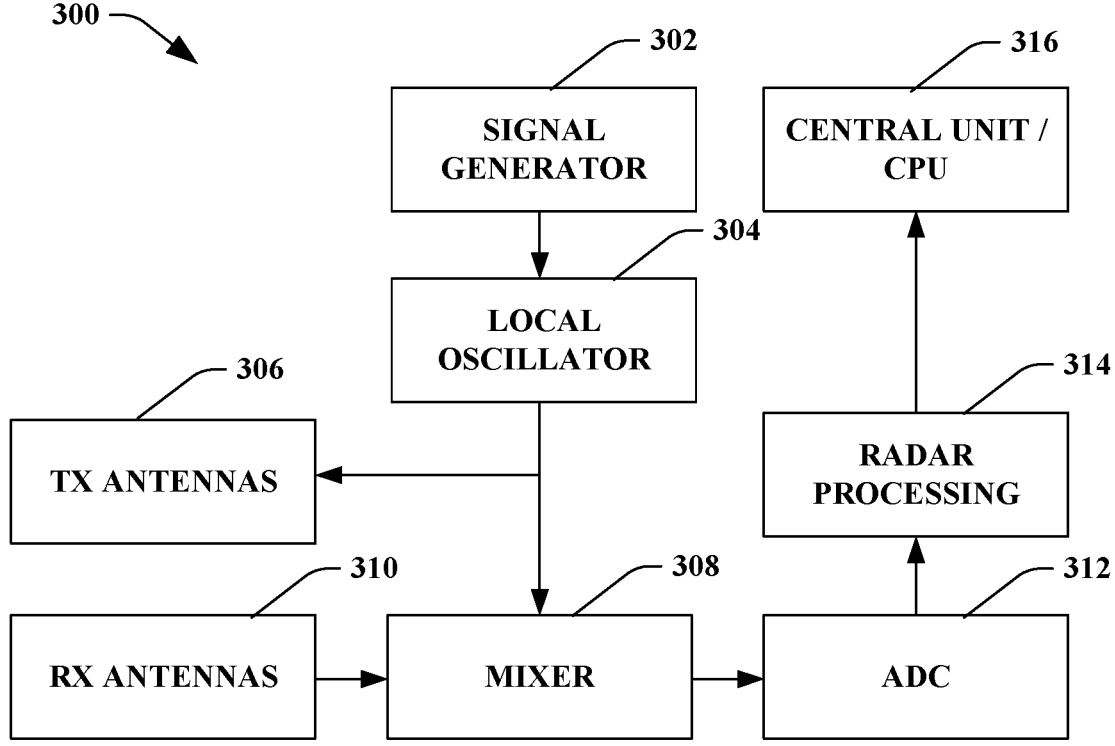
FIG. 3 shows another example of a radar sensor.

FIG. 3 shows another example of a radar sensor unit 300. In contrast to the embodiments described with regard to FIGS. 1 and 2, where signal processing is performed at the radar unit, in the example of FIG. 3, signal processing at the radar sensor terminates with generation of the point clouds, which are then transmitted to a central processing unit or computer where they are processed further. The sensor 300 comprises a signal generator 302 that provides a signal to a local oscillator 304. The local oscillator 304 adjusts the signal for transmission via one or more transmit antennas 306. The local oscillator 304 also provides the transmit signal to a mixer 308, which combines the transmit signal with signals that have been reflected by an object and received by one or more receive antennas 310. The combined signal is then provided by the mixer 308 to an ADC 312, which digitizes the combined signal and provides the digitized signal to a radar processing component 314.

The radar processing unit 314 performs various acts on the digitized signal and provides functionality similar or identical to the functionality provided by the radar processing component 116 of the hardware logic component 106 (see, e.g., FIGS. 1 and 2). The radar processing component 314 generates one or more multi-dimensional point clouds, which are then transmitted to a central processing unit or computer (PC) 316 for additional processing.

Figure 4:
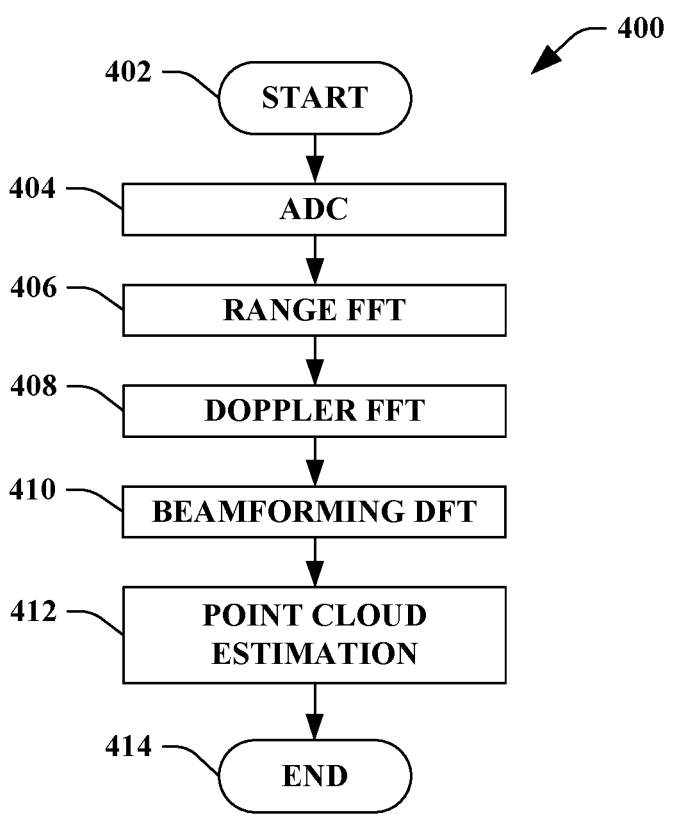
FIG. 4 illustrates a methodology for generating a radar point cloud for use in predicting an object's location in a next radar frame and adjusting a detection threshold for a predicted cell in which the object is likely to be located.
Figure 5:
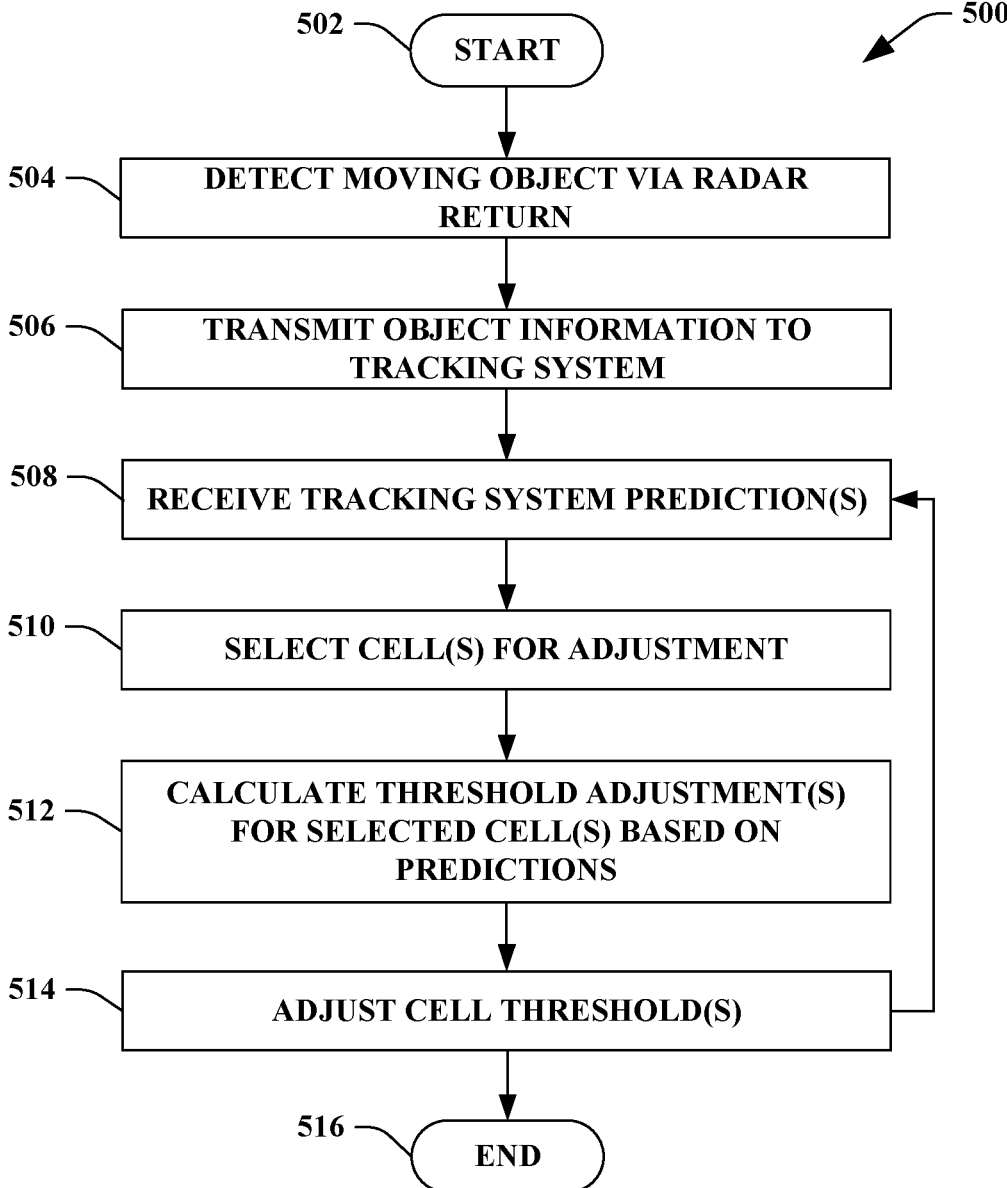
FIG. 5 illustrates a methodology for predicting a detected object's location in a next radar frame and adjusting a detection threshold for a predicted cell in which the object is likely to be located.

In one embodiment, the central processing unit 316 performs the post-point cloud processing steps described with regard to the radar processing component 116 of FIG. 2 and/or executes the methods of FIGS. 4-5. In another embodiment, the central processing unit 316 receives raw radar data from a radar sensor and processes the raw data to provide the functionality described herein.

FIG. 4-5 illustrate exemplary methodologies relating to predicting an object's location in a next radar frame and adjusting a detection threshold for a predicted cell in which the object is likely to be located. While the methodologies are shown and described as being a series of acts that are performed in a sequence, it is to be understood and appreciated that the methodologies are not limited by the order of the sequence. For example, some acts can occur in a different order than is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodology can be stored in a computer-readable medium, displayed on a display device, and/or the like.

Turning now solely to FIG. 4, a methodology 400 is illustrated for generating a radar point cloud for use in predicting an object's location in a next radar frame and adjusting a detection threshold for a predicted cell in which the object is likely to be located. At 402, the method begins. At 404, at a given radar sensor, analog to digital conversion is performed on each signal acted by target object and received by the sensor. This step is performed for each array element (e.g., Tx/Rx pair). Once the received signals have been digitized, then at 406, a range fast Fourier transform is executed thereon to generate range data for the detected object. At 408, a Doppler fest for your transform is executed on the range data in order to generate range and Doppler data. At 410, a beamforming discrete Fourier transform is executed on the range and Doppler data to generate elevation and azimuth data. At 412, the range data, the range and Doppler data, and the elevation and azimuth data are used for point cloud estimation. The method terminates at 414. The point cloud is then provided to the perception system (FIG. 6) for cell prediction in a subsequent radar frame.

Turning now solely to FIG. 5, a methodology 500 is illustrated for predicting a detected object's location in a next or subsequent radar frame and adjusting a detection threshold for a predicted cell in which the object is likely to be located.

The method begins at 502. At 504, an object is detected by a radar sensor. At 506, object information is transmitted to a tracking system. The object information can be included in a point cloud generated by the radar sensor. At 508, tracking system predictions(s) are received. The prediction includes a prediction of the radar cell the object will be in during a next or subsequent radar frame. The prediction also includes a confidence value (e.g., a probability or likelihood) that the object will be in the predicted cell. At 510, one or more cells are selected for detection threshold adjustment. In one embodiment, only the predicted cell is selected. In another embodiment, the predicted cell and one or more neighboring cells are selected. The neighboring cells can have the same detection threshold reduction as the predicted cell, or a lesser reduction.

At 512, detection threshold adjustments are calculated for the one or more selected cells based on confidence values received from the tracking system for the respective one or more selected cells (e.g., the predicted cell and zero or more neighboring cells). In another embodiment, the detection threshold for the predicted cell is reduced based on the confidence value for the predicted cell, and the thresholds for the selected neighboring cells are reduced by a predetermined percentage of the predicted cell reduction. At 514, detection thresholds are adjusted for the respective selected cells based on the respective threshold adjustments calculated at 512. The method reverts to 504 for repeated iterations on a frame-by-frame basis. The method terminates at 516.

Figure 6:
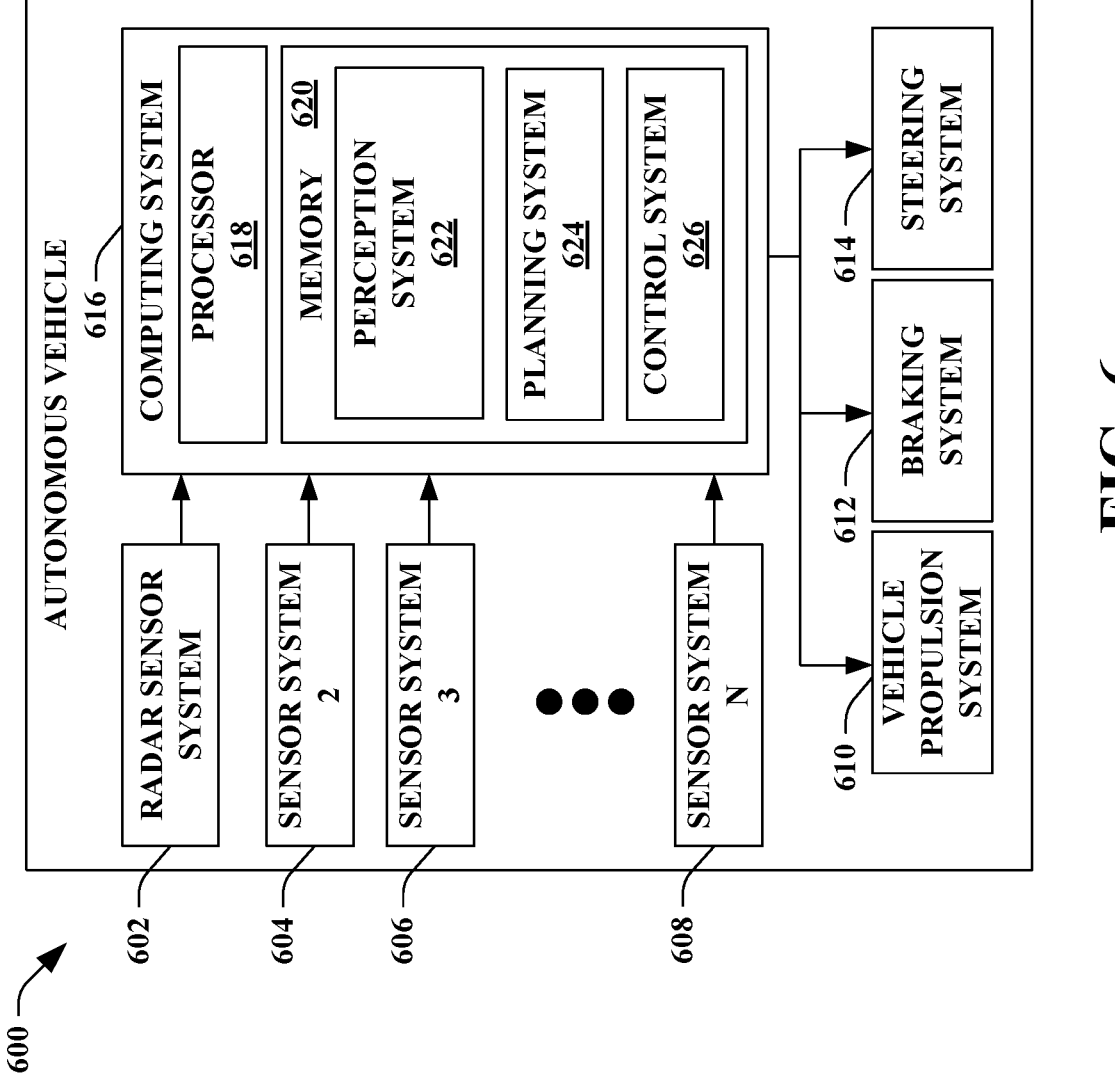
FIG. 6 is a functional block diagram of an exemplary AV.

Various technologies described herein are suitable for use in connection with an autonomous vehicle (AV) that employs a radar system to facilitate navigation about roadways. Referring now to FIG. 6, an exemplary AV 600 is illustrated, wherein the AV 600 can navigate about roadways without human conduction based upon sensor signals output by sensor systems of the AV 600. The AV 600 includes a plurality of sensor systems 602-608 (a first sensor system 602 through an Nth sensor system 608). The sensor systems 602-608 may be of different types. For example, the first sensor system 602 is a radar sensor system, the second sensor system 604 may be a LiDaR sensor system, the third sensor system 606 may be a camera (image) system, and the Nth sensor system 608 may be a sonar system. Other exemplary sensor systems include GPS sensor systems, inertial sensor systems, infrared sensor systems, and the like. The various sensor systems 602-608 are arranged about the AV 600. The sensor systems 602-608 are configured to repeatedly (e.g., continuously, or periodically) output sensor data that is representative of objects and conditions in the driving environment of the AV 600.

The AV 600 further includes several mechanical systems that are used to effectuate appropriate motion of the AV 600. For instance, the mechanical systems can include but are not limited to, a vehicle propulsion system 610, a braking system 612, and a steering system 614. The vehicle propulsion system 610 may be an electric engine, an internal combustion engine, or a combination thereof. The braking system 612 can include an engine brake, brake pads, actuators, a regenerative braking system, and/or any other suitable componentry that is configured to assist in decelerating the AV 600. The steering system 614 includes suitable componentry that is configured to control the direction of movement of the AV 600.

The AV 600 additionally comprises a computing system 616 that is in communication with the sensor systems 602-608 and is further in communication with the vehicle propulsion system 610, the braking system 612, and the steering system 614. The computing system 616 includes a processor 618 and memory 620 that includes computer-executable instructions that are executed by the processor 618. In an example, the processor 618 can be or include a graphics processing unit (GPU), a plurality of GPUs, a central processing unit (CPU), a plurality of CPUs, an application-specific integrated circuit (ASIC), a microcontroller, a programmable logic controller (PLC), a field programmable gate array (FPGA), or the like.

The memory 620 comprises a perception system 622, a planning system 624, and a control system 626. Briefly, the perception system 622 is configured to identify the presence of objects and/or characteristics of objects in the driving environment of the AV 600 based upon sensor data output by the sensor systems 602-608. The planning system 624 is configured to plan a route and/or a maneuver of the AV 600 based upon data pertaining to objects in the driving environment that are output by the perception system 622. The control system 626 is configured to control the mechanical systems 612-614 of the AV 600 to effectuate appropriate motion to cause the AV 600 to execute a maneuver planned by the planning system 624.

The perception system 622 is configured to identify objects in proximity to the AV 600 that are captured in sensor signals output by the sensor systems 602-608. By way of example, the perception system 622 can be configured to identify the presence of an object in the driving environment of the AV 600 based upon images generated by a camera system included in the sensor systems 604-606. In another example, the perception system 622 can be configured to determine a presence and position of an object based upon radar data output by the radar sensor system 602. In exemplary embodiments, the radar sensor system 602 can be or include the radar sensor 100 and/or 300. In such embodiments, the perception system 622 can be configured to identify a position of an object in the driving environment of the AV 600 based upon the estimated range output by the radar sensor 100 and/or 300.

The AV 600 can be included in a fleet of AVs that are in communication with a common server computing system. In these embodiments, the server computing system can control the fleet of AVs such that radar sensor systems of AVs operating in a same driving environment (e.g., within line of sight of one another, or within a threshold distance of one another) employ different pulse sequence carrier frequencies. In an exemplary embodiment, a radar sensor system of a first AV can be controlled so as not to transmit pulse sequences having same center frequencies as pulse sequences transmitted by a radar sensor system of a second AV at the same time. In further embodiments, the radar sensor system of the first AV can be controlled to transmit pulse sequences in a different order than a radar sensor system of a second AV. For instance, the radar sensor system of the first AV can be configured to transmit a set of pulse sequences at four different center frequencies A, B, C, and D in an order A, B, C, D. The radar sensor system of the second AV can be configured to transmit pulse sequences using a same set of center frequencies in a frequency order B, A, D, C. Such configurations can mitigate the effects of interference when multiple AVs that employ radar sensor systems are operating in a same driving environment.

Figure 7:
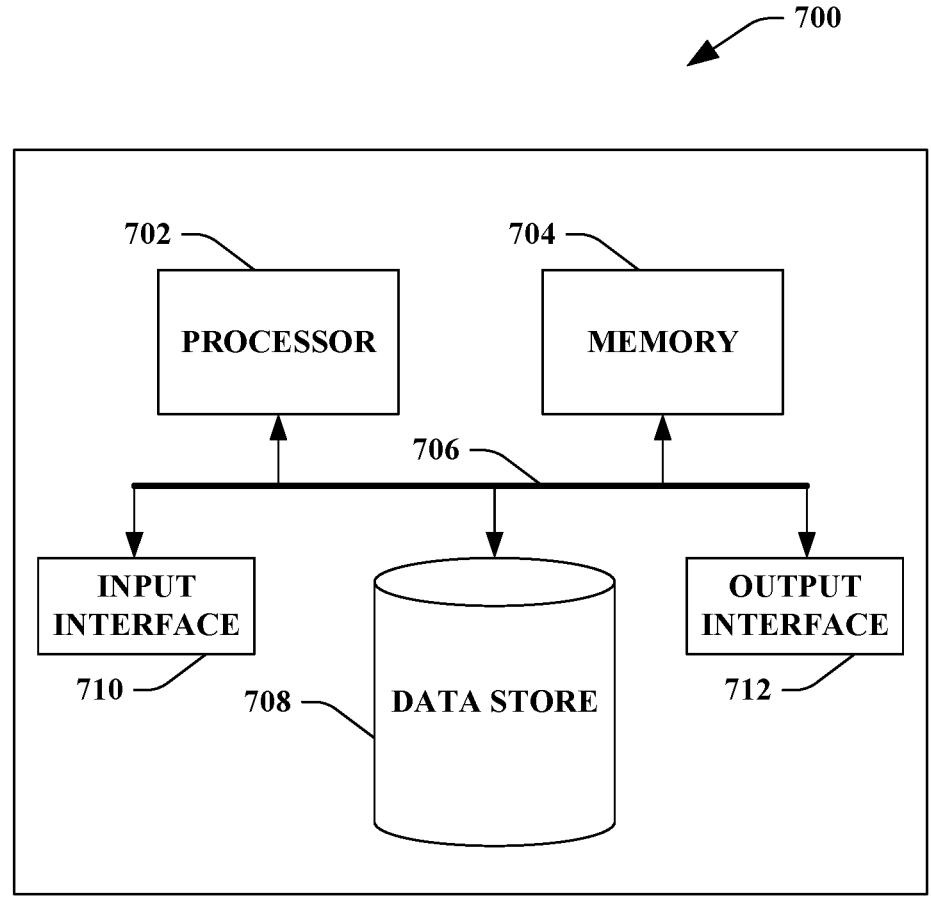
FIG. 7 is an exemplary computing system.

Referring now to FIG. 7, a high-level illustration of an exemplary computing device 700 that can be used in accordance with the systems and methodologies disclosed herein is illustrated. For instance, the computing device 700 may be or include the computing system 616. The computing device 700 includes at least one processor 702 that executes instructions that are stored in a memory 704. The instructions may be, for instance, instructions for implementing functionality described as being carried out by one or more modules, components, or systems discussed above or instructions for implementing one or more of the methods described above. The processor 702 may be a GPU, a plurality of GPUs, a CPU, a plurality of CPUs, a multi-core processor, a combination of the foregoing, etc. The processor 702 may access the memory 704 by way of a system bus 706. In addition to storing executable instructions, the memory 704 may also store radar data, beamformed radar data, neural network configurations, etc.

The computing device 700 additionally includes a data store 708 that is accessible by the processor 702 by way of the system bus 706. The data store 708 may include executable instructions, radar data, beamformed radar data, embeddings of these data in latent spaces, etc. The computing device 700 also includes an input interface 710 that allows external devices to communicate with the computing device 700. For instance, the input interface 710 may be used to receive instructions from an external computing device, etc. The computing device 700 also includes an output interface 712 that interfaces the computing device 700 with one or more external devices. For example, the computing device 700 may transmit control signals to the vehicle propulsion system 610, the braking system 612, and/or the steering system 614 by way of the output interface 712.

Additionally, while illustrated as a single system, it is to be understood that the computing device 700 may be a distributed system. Thus, for instance, several devices may be in communication by way of a network connection and may collectively perform tasks described as being performed by the computing device 700.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include FPGAs, ASICs, Application-specific Standard Products (ASSPs), SOCs, Complex Programmable Logic Devices (CPLDs), etc.

Described herein are various technologies according to at least the following examples.

(A1) In an aspect, a method performed by a radar system includes receiving at a receive antenna a radar return. The method also includes detecting an object based on information in the radar return. The method further includes generating and providing to a tracking system a point cloud comprising information related to the detected object receiving from the tracking system an indication of a predicted cell in which the detected object is predicted to be located in a subsequent radar frame, wherein the predicted cell is associated with a confidence value. Additionally, the method includes reducing, for the subsequent radar frame, a detection threshold value for the predicted cell.

(A2) In some embodiments of the method of (A1), the confidence value represents a likelihood that the detected object will be in the predicted cell in the subsequent radar frame.

(A3) In some embodiments of the method of at least one of (A1)-(A2), reducing the detection threshold value comprises calculating a reduced detection threshold value based on the confidence value.

(A4) In some embodiments of the method of at least one of (A1)-(A3), the confidence value is between 0 and 1, and wherein the reduced detection threshold approaches a minimum power threshold for detecting an object as the confidence value approaches 1.

(A5) In some embodiments of the method of at least one of (A1)-(A4), the method further includes identifying one or more neighboring cells near the predicted cell, and for a given neighboring cell, reducing a detection threshold based on a confidence value associated the given neighboring cell.

(A6) In some embodiments of the method of at least one of (A1)-(A5), the confidence value is based on object information from one or more of a radar system, a lidar system, or a camera system.

(A7) In some embodiments of the method of at least one of (A1)-(A6), the method is performed on a frame-by-frame basis.

(B1) In another aspect, a radar system is configured to perform at least one of the methods disclosed herein (e.g., any of the methods of (A1)-(A7)).

(C1) In yet another aspect, a radar system includes a hardware logic component (e.g., circuitry), where the hardware logic component is configured to control elements of a radar system to perform at least one of the methods disclosed herein (e.g., any of the methods of (A1)-(A7)).

(D1) In yet another aspect, a radar system includes a transmit antenna that transmits a radar signal, a receive antenna that receives a radar return, and circuitry configured to perform certain acts. The acts include detecting an object based on information in the radar return. The acts further include generating and providing to a tracking system a point cloud comprising information related to the detected object. The acts also include receiving from the tracking system an indication of a predicted cell in which the detected object is predicted to be located in a subsequent radar frame, wherein the predicted cell is associated with a confidence value. Additionally the acts include reducing, for the subsequent radar frame, a detection threshold value for the predicted cell.

(D2) In some embodiments of the radar system of (D1), the confidence value represents a likelihood that the detected object will be in the predicted cell in the subsequent radar frame.

(D3) In some embodiments of the radar system of at least one of (D1)-(D2), reducing the detection threshold value comprises calculating a reduced detection threshold value based on the confidence value.

(D4) In some embodiments of the radar system of at least one of (D1)-(D3), the confidence value is between 0 and 1, and wherein the reduced detection threshold approaches a minimum power threshold for detecting an object as the confidence value approaches 1.

(D5) In some embodiments of the radar system of at least one of (D1)-(D4), the acts further include identifying one or more neighboring cells near the predicted cell, and for a given neighboring cell, reducing a detection threshold based on a confidence value associated the given neighboring cell.

(D6) In some embodiments of the radar system of at least one of (D1)-(D5), the confidence value is based on object information from one or more of a radar system, a lidar system, and a camera system.

(D7) In some embodiments of the radar system of at least one of (D1)-(D6), the acts are performed on a frame-by-frame basis.

(E1) In another aspect, a radar system includes a transmit antenna that transmits a radar signal, a receive antenna that receives a radar return, and a hardware logic component that is configured to perform certain acts. The acts include receiving from the receive antenna a radar signal received by the receive antenna in the radar return. The acts further include detecting an object based on information in the radar signal. The acts also include generating and providing to a tracking system a point cloud comprising information related to the detected object. Additionally, the acts include receiving from the tracking system an indication of a predicted cell in which the detected object is predicted to be located in a subsequent radar frame, wherein the predicted cell is associated with a confidence value. Moreover, the acts include reducing, for the subsequent radar frame, a detection threshold value for the predicted cell.

(E2) In some embodiments of the radar system of (E1), the confidence value represents a likelihood that the detected object will be in the predicted cell in the subsequent radar frame.

(E3) In some embodiments of the radar system of at least one of (E1)-(E2), reducing the detection threshold value comprises calculating a reduced detection threshold value based on the confidence value.

(E4) In some embodiments of the radar system of at least one of (E1)-(E3), the confidence value is between 0 and 1, and wherein the reduced detection threshold approaches a minimum power threshold for detecting an object as the confidence value approaches 1.

(E5) In some embodiments of the radar system of at least one of (E1)-(E4), the acts further include identifying one or more neighboring cells near the predicted cell, and for a given neighboring cell, reducing a detection threshold based on a confidence value associated the given neighboring cell.

(E6) In some embodiments of the radar system of at least one of (E1)-(E5), the confidence value is based on object information from one or more of a radar system, a lidar system, and a camera system.

(F1) In still yet another aspect, use of any of the radar systems (e.g., any of (B1), (C1), (D1)-(D7) or (E1-E6)) to detect and classify a target is contemplated.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method performed by a radar system, the method comprising:

receiving at a receive antenna a radar return;

detecting an object based on information in the radar return;

generating and providing to a tracking system a point cloud comprising information related to the detected object;

receiving from the tracking system an indication of a predicted cell in which the detected object is predicted to be located in a subsequent radar frame, wherein the predicted cell is associated with a confidence value which represents a likelihood that the detected object will be in the predicted cell in the subsequent radar frame; and modifying, for the subsequent radar frame and based on the confidence value, a detection threshold value for detecting the detected object with respect to the predicted cell, wherein modifying the detection threshold value comprises:

reducing the detection threshold value toward a minimum power threshold for detecting the detected object as the confidence value approaches 1; and adjusting the detection threshold value toward an originally assigned power threshold for detecting the detected object as the confidence value approaches 0.

2. The method of claim 1, wherein reducing the detection threshold value comprises calculating a reduced detection threshold value based on the confidence value.

3. The method of claim 1, wherein:

the confidence value ranges from 0 to 1, and wherein the detection threshold value equals the minimum power threshold for detecting the detected object when the confidence value equals 1; and the detection threshold value equals the originally assigned power threshold for detecting the detected object when the confidence value equals 0.

4. The method of claim 1, further comprising identifying one or more neighboring cells near the predicted cell, and reducing a detection threshold value for detecting the detected object for a given neighboring cell based on a confidence value associated with the given neighboring cell, wherein the confidence value which represents a likelihood that the detected object will be in the given neighboring cell in the subsequent radar frame.

5. The method of claim 1, wherein the confidence value is based on object information from one or more of a radar system, a lidar system, and a camera system.

6. The method of claim 1, performed on a frame-by-frame basis.

7. A radar system comprising:

a transmit antenna that transmits a radar signal;

a receive antenna that receives a radar return; and circuitry configured to perform acts comprising:

detecting an object based on information in the radar return;

generating and providing to a tracking system a point cloud comprising information related to the detected object;

receiving from the tracking system an indication of a predicted cell in which the detected object is predicted to be located in a subsequent radar frame, wherein the predicted cell is associated with a confidence value which represents a likelihood that the detected object will be in the predicted cell in the subsequent radar frame; and modifying, for the subsequent radar frame and based on the confidence value, a detection threshold value for detecting the detected object with respect to the predicted cell, wherein modifying the detection threshold value comprises:

reducing the detection threshold value toward a minimum power threshold for detecting the detected object as the confidence value approaches 1; and adjusting the detection threshold value toward an originally assigned power threshold for detecting the detected object as the confidence value approaches 0.

8. The radar system of claim 7, wherein reducing the detection threshold value comprises calculating a reduced detection threshold value based on the confidence value.

9. The radar system of claim 7, wherein:

the confidence value ranges from 0 to 1, and wherein the detection threshold value equals the minimum power threshold for detecting the detected object when the confidence value equals 1; and the detection threshold value equals the originally assigned power threshold for detecting the detected object when the confidence value equals 0.

10. The radar system of claim 7, further comprising identifying one or more neighboring cells near the predicted cell, and reducing a detection threshold value for detecting the detected object for a given neighboring cell based on a confidence value associated with the given neighboring cell, wherein the confidence value which represents a likelihood that the detected object will be in the given neighboring cell in the subsequent radar frame.

11. The radar system of claim 7, wherein the confidence value is based on object information from one or more of a radar system, a lidar system, and a camera system.

12. The radar system of claim 7, wherein the acts are performed on a frame-by-frame basis.

13. A radar system comprising:

a transmit antenna that transmits a radar signal;

a receive antenna that receives a radar return; and a hardware logic component that is configured to perform acts comprising:

receiving from the receive antenna a radar signal received by the receive antenna in the radar return;

detecting an object based on information in the radar signal;

generating and providing to a tracking system a point cloud comprising information related to the detected object;

receiving from the tracking system an indication of a predicted cell in which the detected object is predicted to be located in a subsequent radar frame, wherein the predicted cell is associated with a confidence value which represents a likelihood that the detected object will be in the predicted cell in the subsequent radar frame; and modifying, for the subsequent radar frame and based on the confidence value, a detection threshold value for detecting the detected object with respect to the predicted cell, wherein modifying the detection threshold value comprises:

reducing the detection threshold value toward a minimum power threshold for detecting the detected object as the confidence value approaches 1; and adjusting the detection threshold value toward an originally assigned power threshold for detecting the detected object as the confidence value approaches 0.

14. The radar system of claim 13, wherein reducing the detection threshold value comprises calculating a reduced detection threshold value based on the confidence value.

15. The radar system of claim 13, wherein the confidence value ranges from 0 to 1, the detection threshold value equals the minimum power threshold for detecting the detected object when the confidence value equals 1; and the detection threshold value equals the originally assigned power threshold for detecting the detected object when the confidence value equals 0.

16. The radar system of claim 13, further comprising identifying one or more neighboring cells near the predicted cell, and reducing a detection threshold value for detecting the detected object for a given neighboring cell based on a confidence value associated with the given neighboring cell, wherein the confidence value which represents a likelihood that the detected object will be in the given neighboring cell in the subsequent radar frame.

17. The radar system of claim 13, wherein the confidence value is based on object information from one or more of a radar system, a lidar system, and a camera system.

* * * * *